(12) United States Patent
Mizutani

(10) Patent No.: US 11,486,735 B2
(45) Date of Patent: Nov. 1, 2022

(54) ELECTROMAGNETIC INDUCTIVE ENCODER

(71) Applicant: Mitutoyo Corporation, Kanagawa (JP)

(72) Inventor: Miyako Mizutani, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/496,350

(22) Filed: Oct. 7, 2021

(65) Prior Publication Data

US 2022/0113168 A1    Apr. 14, 2022

(30) Foreign Application Priority Data

Oct. 12, 2020  (JP) .............................. JP2020-171953

(51) Int. Cl.
*G01D 5/20*    (2006.01)

(52) U.S. Cl.
CPC .................................. *G01D 5/2073* (2013.01)

(58) Field of Classification Search
CPC ....................................................... G01D 5/2073
See application file for complete search history.

(56) References Cited

U.S. PATENT DOCUMENTS

| | | | | |
|---|---|---|---|---|
| 7,652,469 B2 * | 1/2010 | Meyer | .................... | G01D 5/202 324/207.16 |
| 9,013,192 B2 * | 4/2015 | Vasiloiu | .................. | G01B 7/003 324/207.17 |
| 2018/0274949 A1 | 9/2018 | Kubozono | | |
| 2022/0065662 A1 * | 3/2022 | Lu | ........................ | G01D 5/2086 |
| 2022/0120551 A1 * | 4/2022 | Hao | ..................... | G01D 5/2086 |

FOREIGN PATENT DOCUMENTS

JP    2018-159658    10/2018

* cited by examiner

*Primary Examiner* — Walter L Lindsay, Jr.
*Assistant Examiner* — Milton Gonzalez
(74) *Attorney, Agent, or Firm* — Rankin, Hill & Clark LLP

(57) ABSTRACT

An electromagnetic inductive encoder that can suppress the effect of changes in magnetic flux received by the receiver section and maintain the accuracy of measurement results is provided. The electromagnetic inductive encoder 1 includes a scale 2 and a head 3 that is provided to face the scale 2 and moves relative to the scale 2. The head 3 includes a transmitter section 4 and a receiver section 5 with a plurality of receiving coils 500. The receiver section 5 has a first receiver section 51 with at least one receiving coil 500, a second receiver section 52 that is provided apart from the first receiver section 51 and has at least one receiving coil 500 different from the first receiver section 51, and connection wiring 53 that connects the first receiver section 51 and second receiver section 52. The first receiver section 51 and the second receiver section 52 are arranged linearly symmetrically with the axis L1 of the Y-direction, which is orthogonal to the X-direction (measurement direction) in the plane 30 where the receiving coils 500 are arranged, and are arranged in the same number.

7 Claims, 7 Drawing Sheets

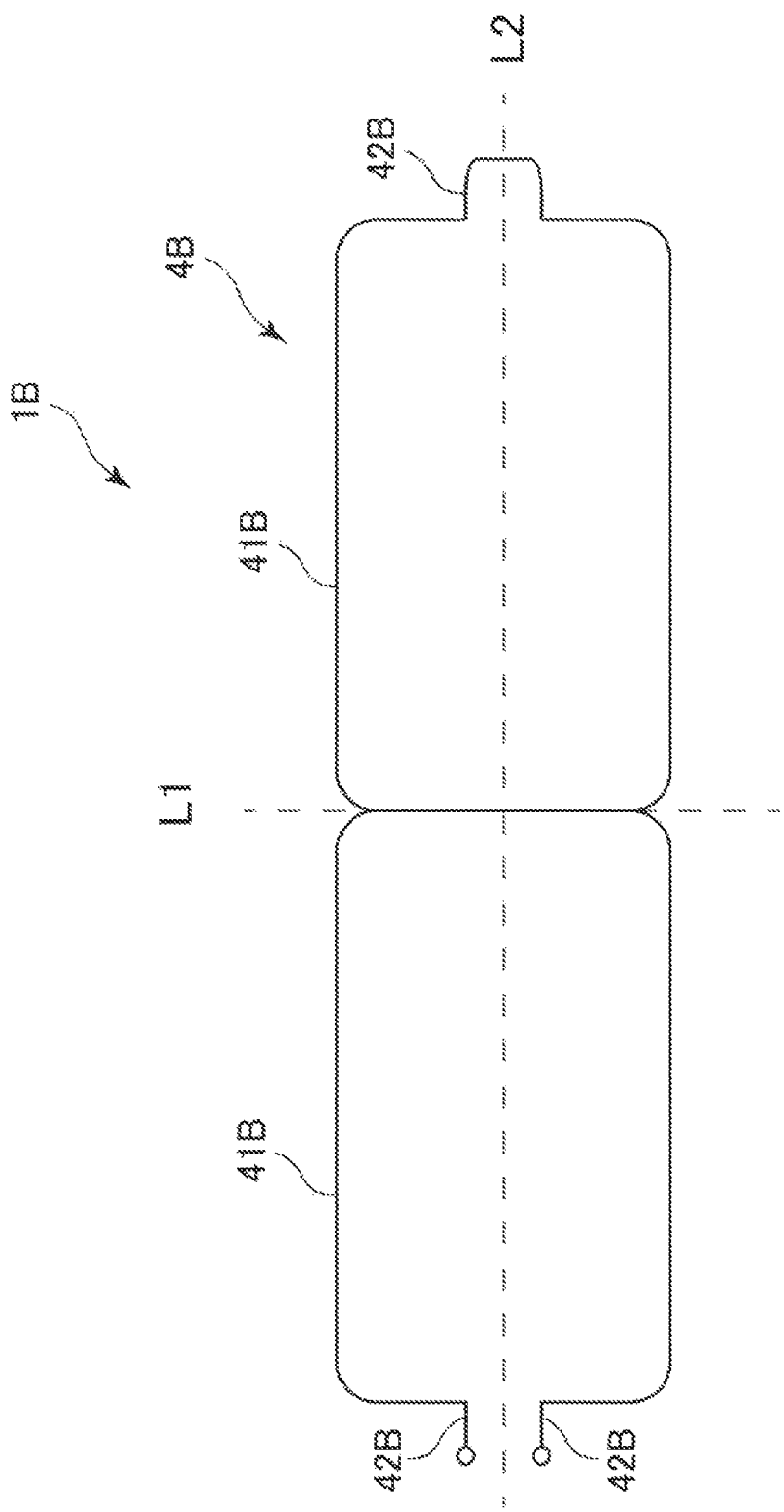

ELECTROMAGNETIC INDUCTIVE ENCODER

CROSS-REFERENCE TO RELATED APPLICATION

This non-provisional application claims priority under 35 U.S.C. § 119(a) from Japanese Patent Application No. 2020-171953, filed on Oct. 12, 2020, the entire contents of which are incorporated herein by reference.

BACKGROUND

Technical Field

The present invention relates to an electromagnetic inductive encoder.

Background Art

A Conventional electromagnetic inductive encoder 1 is known to have a scale with a scale coil and a head that moves relative to the scale along the measurement direction. For example, the head in the electromagnetic inductive displacement detection device (electromagnetic inductive encoder) described in JP 2018-159658 has a transmitter section having a transmitting coil that generates magnetic flux in the scale coil, and a receiver section having a first receiver section and a second receiver section that receive changes in magnetic flux from the scale coil, with the first receiver section and the second receiver section displaced along the measurement direction. The first and second receiver sections have a plurality of coil lines with a plurality of receiving coils arranged along the row direction parallel to the measurement direction. These coil lines are arranged side by side along the column direction orthogonal to the row direction. The receiver section has one end, the other end, a central section. The one end and the other end are located at one end and the other end of the receiver section in the measurement direction, respectively, and have a sparse density of a plurality of receiving coils. The central section is located between the one end and the other end and has a dense density of a plurality of receiving coils.

Here, the head is placed at an angle to the scale in the roll, pitch, and yaw directions, which may affect the change in magnetic flux received by the receiver section. For example, the head may rotate with respect to the scale, and when one end is close to the scale, the other end is separated from the scale. In this case, one end of the receiver section is more affected by the change in magnetic flux received, while the other end of the receiver section is less affected by the change in magnetic flux received. The head may rotate with respect to the scale, and when one end is separated from the scale, the other end is close to the scale. In this case, one end of the receiver section is less affected by the change in magnetic flux received, while the other end of the receiver section is more affected by the change in magnetic flux received.

Against the effect of such magnetic flux changes, the one end and the other end of the plurality of receiving coils in the electromagnetic induction type displacement detection device, where the density of the plurality of receiving coils is made sparse, are less susceptible to the effect of magnetic flux changes received by the receiving unit, even if the head rotates and moves closer to or farther from the scale, because the magnetic flux changes caused by the plurality of receiving coils are smaller than those in the center where the density of the plurality of receiving coils is made dense. The magnitude of the magnetic flux generated in the central section, where the density of the plurality of receiving coils is made dense, is larger than that of the one end and the other end, where the density of the plurality of receiving coils is made sparse, even if the head rotates and moves closer to or farther from the scale. This allows the electromagnetic induction type displacement detection device to stabilize the change in magnetic flux received by the receiver section and to suppress the effect of the change in magnetic flux.

SUMMARY OF THE INVENTION

Problems to be Solved by the Invention

However, although the receiver section described in JP 2018-159658 is arranged symmetrically with respect to a given axial direction or rotation axis for the entire receiver section, the first receiver, the second receiver, etc., are not symmetrical. Therefore, changes in magnetic flux received by the multiple receiving coils may be received non-uniformly, especially when the head rotates and moves closer or further away from the scale. The problem is that if the magnetic flux change is non-uniform, the accuracy of the measurement results detected from the magnetic flux change may deteriorate.

The purpose of the present invention is to provide an electromagnetic inductive encoder that can suppress the effect of changes in magnetic flux received by the receiver section and maintain the accuracy of measurement results.

Means for Solving the Problems

An electromagnetic inductive encoder of the present invention includes a scale with a scale coil and a head that moves relative to the scale along the measurement direction. The head has a transmitter section with a transmission coil that generates magnetic flux in the scale coil and a receiver section with a plurality of receiving coils arranged in the same plane along the measurement direction that receives changes in magnetic flux from the scale coil. The receiver section has a first receiver section with at least one receiving coil, a second receiver section that is provided apart from the first receiver section and has at least one receiving coil different from the first receiver section, and connection wiring that connects the first receiver section and second receiver section. The first receiver section and the second receiver section are arranged linearly symmetrically with the axis of the orthogonal direction orthogonal to the measurement direction in the plane where the receiving coils are arranged. The first receiver section and the second receiver section are arranged in the same number.

According to the present invention, in the receiver section, the first receiver section and the second receiver section provided apart from the first receiver section are connected by the connection wiring. The first receiver section and the second receiver section are arranged linearly symmetrically with the axis of the orthogonal direction, and are arranged in the same number. With this configuration, even if, for example, the head rotates and one or the other end of the head in the measurement direction is close to or separated from the scale, the receiving section can still detect the magnetic flux change stably because the receiver section is arranged linearly symmetrically with the axis of the orthogonal direction with the connecting wiring at the center. Therefore, the electromagnetic inductive encoder can maintain the accuracy of measurement results by suppressing the effects of changes in the magnetic flux received by the receiver section.

Here, the electromagnetic induction type displacement detection device described in JP 2018-159658 achieves symmetry of the entire receiver section by stacking multiple receiver sections, which can be expensive to manufacture.

On the other hand, according to the present invention, the first receiver section and second receiver section are arranged linearly symmetrically with the axis of the orthogonal direction orthogonal to the measurement direction in the plane where the receiving coils are arranged, and are arranged in the same number. Thereby, symmetry can be achieved without stacking multiple receiver sections. Therefore, the manufacturing cost of the electromagnetic inductive encoder can be reduced compared to the manufacturing cost of conventional encoders.

The connection wiring is preferably arranged in a straight line parallel to the measurement direction and formed with a length that is an integer multiple of the length in the measurement direction of one receiving coil.

Here, magnetic flux is generated in the receiving coil by the transmission coil. When a plurality of receiving coils are adjacent to each other, each receiving coil will have alternating positive and negative magnetic flux along the adjacent direction of the plurality of receiving coils. And when multiple receiving coils are connected with the connection wiring along the adjacent direction, no magnetic flux is generated in the part of the connection wiring. Therefore, depending on the length of the connection wiring, there may be changes in the magnetic flux received by the receiver section, and the accuracy of the measurement results may deteriorate.

However, according to such a configuration, the connection wiring is arranged in a straight line parallel to the measurement direction and is formed with a length that is an integer multiple of the length in the measurement direction of one receiving coil. Thereby, the part of the connection wiring that does not generate magnetic flux can be appropriately interpolated. Therefore, the electromagnetic inductive encoder can maintain the accuracy of measurement results by suppressing the effects of changes in the magnetic flux received by the receiver section.

Further, since the connection wiring is arranged in a straight line parallel to the measurement direction, the symmetry of the arrangement of the plurality of receiving coils in the receiving unit with the axis of the orthogonal direction can be easily achieved.

The connection wiring is preferably formed with a length that is an odd multiple of the length in the measurement direction in one receiving coil.

According to such a configuration, since the connection wiring is formed with a length that is an odd multiple of the length in the measurement direction in one receiving coil, it is possible to properly interpolate for the portion of the connection wiring where magnetic flux is not generated without disturbing the magnetic flux in the positive and negative directions generated in each receiving coil.

The connection wiring is preferably formed with a length that is an even multiple of the length in the measurement direction in one receiving coil.

According to such a configuration, since the connection wiring is formed with a length that is an even multiple of the length in the measurement direction in one receiving coil, it is possible to properly interpolate for the magnetic flux at the connection wiring without disturbing the magnetic flux in the positive and negative directions generated in each receiving coil.

The receiver section may have a plurality of wiring layers in which coil wirings forming the receiving coils are provided. The coil wiring is preferably arranged linearly symmetrically with the axis of the orthogonal direction in each of the multiple wiring layers.

According to such a configuration, since the coil wiring that forms the receiving coil is arranged linearly symmetrically with the axis of the orthogonal direction in each of the multiple wiring layers, symmetry can be easily achieved at the receiver section.

The transmission coil is preferably arranged linearly symmetrically with the axis of the orthogonal direction orthogonal to the measurement direction in the plane where the transmission coil is provided.

According to such a configuration, since the transmission coil is arranged linearly symmetrically with the axis of the orthogonal direction orthogonal to the measurement direction in the plane where the transmission coil is provided, symmetry can be easily achieved not only in the receiver section but also in the transmitter section.

The transmission coil may have a pull-out wiring section with wiring that extends and is pulled out from the transmission coil for connection to other components. The pull-out wiring section is preferably arranged linearly symmetrically with the axis of at least one of the measurement direction and the orthogonal direction orthogonal to the measurement direction in the plane where the transmission coil is provided.

According to such a configuration, even when the transmission coil has the pull-out wiring section, since the pull-out wiring section is arranged linearly symmetrically with the axis of at least one of the measurement direction and the orthogonal direction orthogonal to the measurement direction in the plane where the transmission coil is provided, symmetry can be easily achieved.

In this case, the transmitter section may have two transmission coils. The two transmission coils are preferably arranged linearly symmetrically with the axis of at least one of the measurement direction and the orthogonal direction orthogonal to the measurement direction in the plane where the transmission coils are provided.

According to such a configuration, even when the transmission section is composed of two transmission coils, since the two transmission coils are linearly symmetrically arranged with the axis of at least one of the measurement direction and the orthogonal direction orthogonal to the measurement direction in the plane where the transmission coils are provided, symmetry can be easily achieved.

The electromagnetic inductive encoder of the present invention may include a scale with a scale coil and a head that moves relative to the scale along the measurement direction. The head may have a transmitter section with a transmission coil that generates magnetic flux in the scale coil and a receiver section with a plurality of receiving coils arranged in the same plane along the measurement direction that receives changes in magnetic flux from the scale coil. The transmission coil may be arranged linearly symmetrically with the axis of the orthogonal direction orthogonal to the measurement direction in the plane where the transmission coil is provided.

According to the present invention, since the transmission coil is arranged linearly symmetrically with the axis of the orthogonal direction orthogonal to the measurement direction in the plane where the transmission coil is provided, symmetry can be easily achieved in the transmitter section.

BRIEF DESCRIPTION OF THE DRAWINGS

FIG. 7 is a top illustrating a transmitter section of the electromagnetic inductive encoder according to the third embodiment.

DETAILED DESCRIPTION OF THE EMBODIMENTS

First Embodiment

Hereinafter, a first embodiment of the present invention will be described with reference to FIGS. 1 to 5B.

Figure 1:
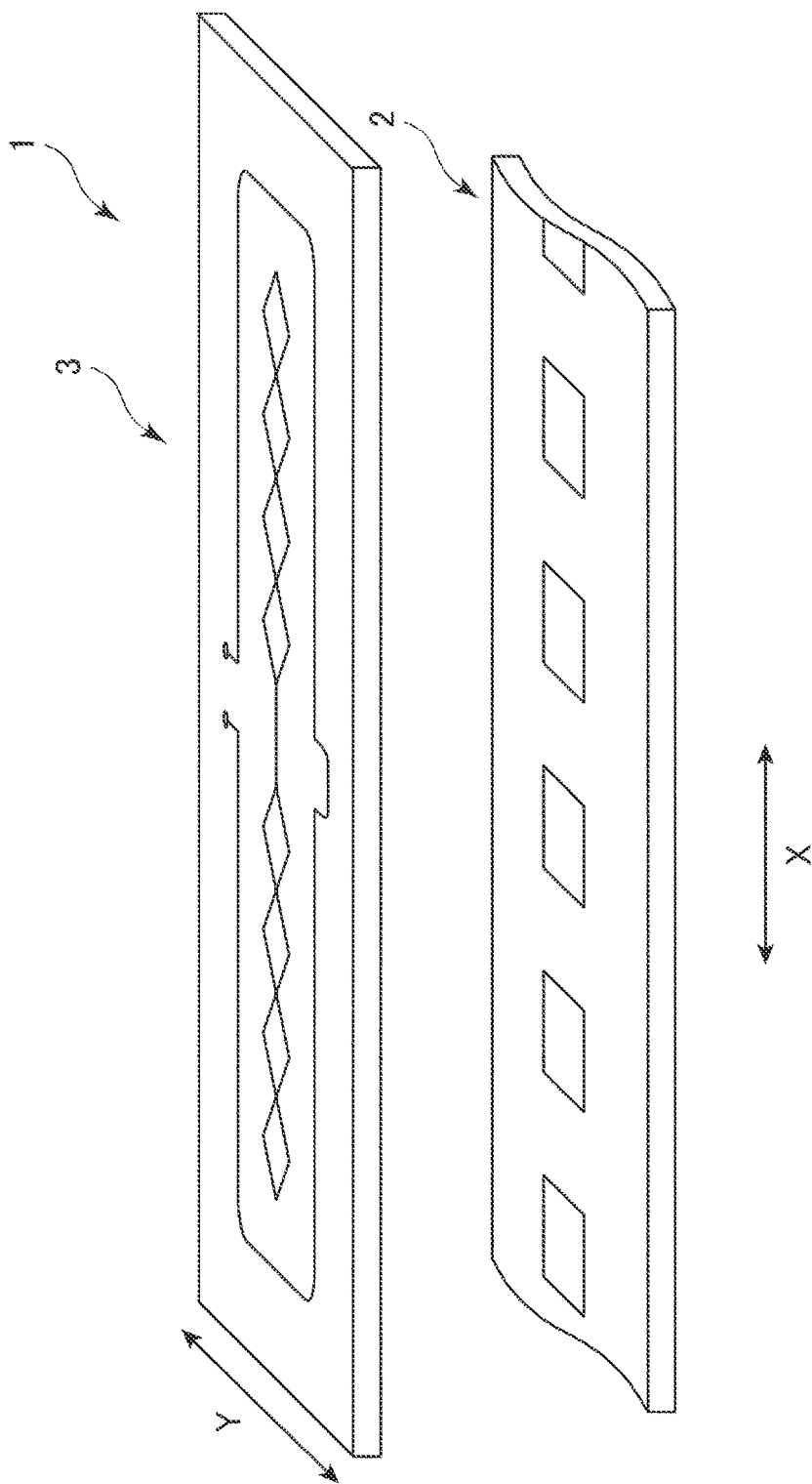
FIG. 1 is a perspective view illustrating an electromagnetic inductive encoder according to the first embodiment.

FIG. 1 is a perspective view illustrating an electromagnetic inductive encoder 1 according to the first embodiment.

As shown in FIG. 1, the electromagnetic inductive encoder 1 includes an elongated scale 2 and a head 3 that is provided to face the scale 2 and moves relative to the scale 2 along a measurement direction. The electromagnetic inductive encoder 1 is provided inside an electromagnetic inductive caliper as a measuring instrument.

The electromagnetic inductive caliper moves the scale 2 and the head 3 relative to each other along the X-direction, which is the measurement direction, and detects the amount of movement therebetween with the electromagnetic inductive encoder 1 using an induced current, and outputs the measurement results based on the detected amount of movement to a display unit such as an LCD screen that is not shown in the drawings.

In the following description and each drawing, the longitudinal direction of the scale 2 and the moving direction (measuring direction) of the head 3 is described as the X-direction, and the width direction of the scale 2 that is orthogonal to the X-direction is described as the Y-direction.

Figure 2:
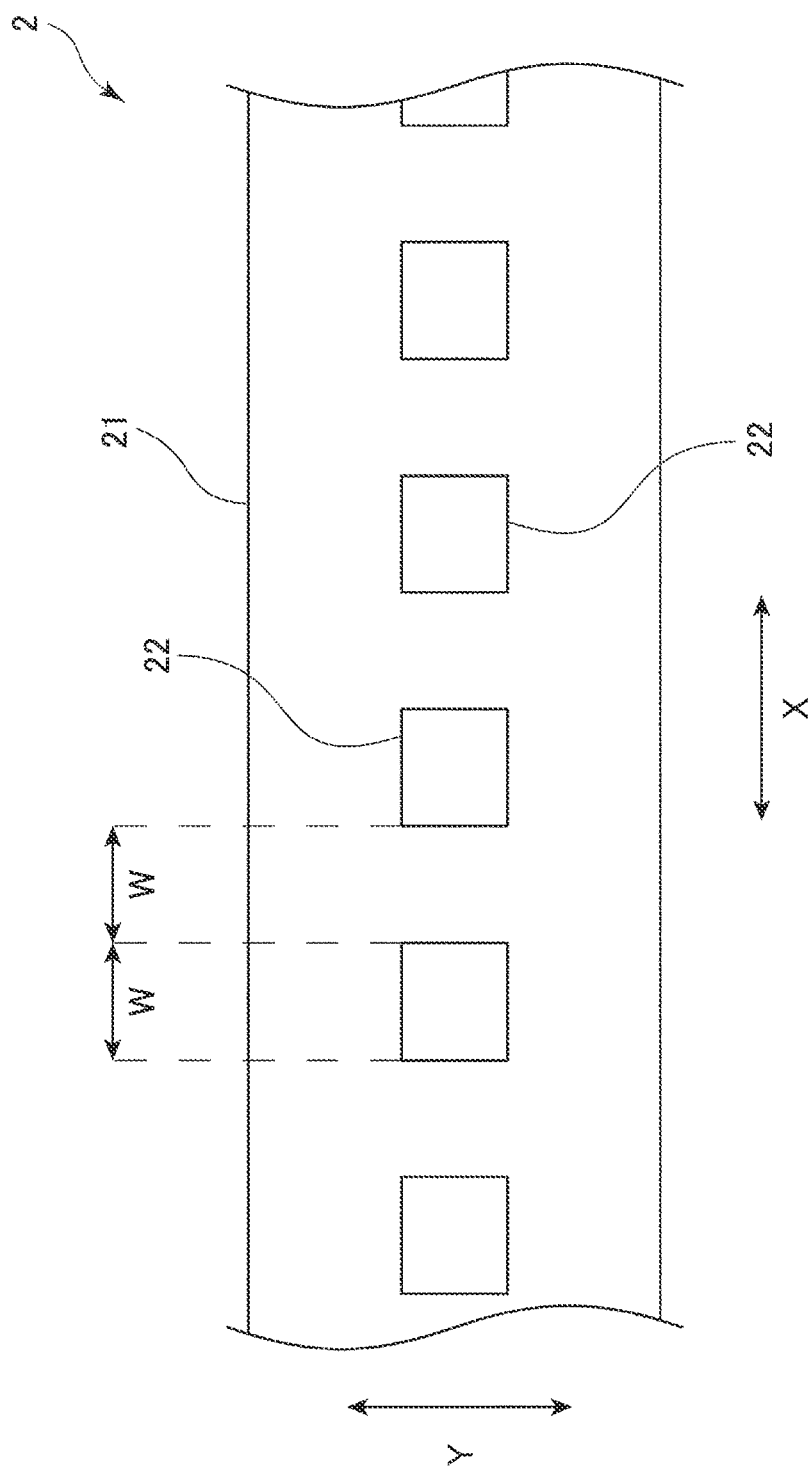
FIG. 2 is a top view of a scale for the electromagnetic inductive encoder.

FIG. 2 is a top view of the scale 2 for the electromagnetic inductive encoder 1.

As shown in FIG. 2, the scale 2 has an insulating substrate 21 made of long glass epoxy resin and a scale coil 22 that is provided to face the head 3.

The insulating substrate 21 may be made of a material such as glass or silicon instead of a glass epoxy resin.

The scale coil 22 is made of a material with low electrical resistance, such as aluminum, copper, or gold, and consists of a rectangular-shaped wire conductor with a width W in the X-direction.

The scale coils 22 are provided on the scale 2 at every pitch W, which is the same length as the width W of the scale coils 22, along the X-direction. The scale coil 22 may be a metal plate or the like instead of the wire conductor, and such metal plates may be periodically arranged.

Figure 3:
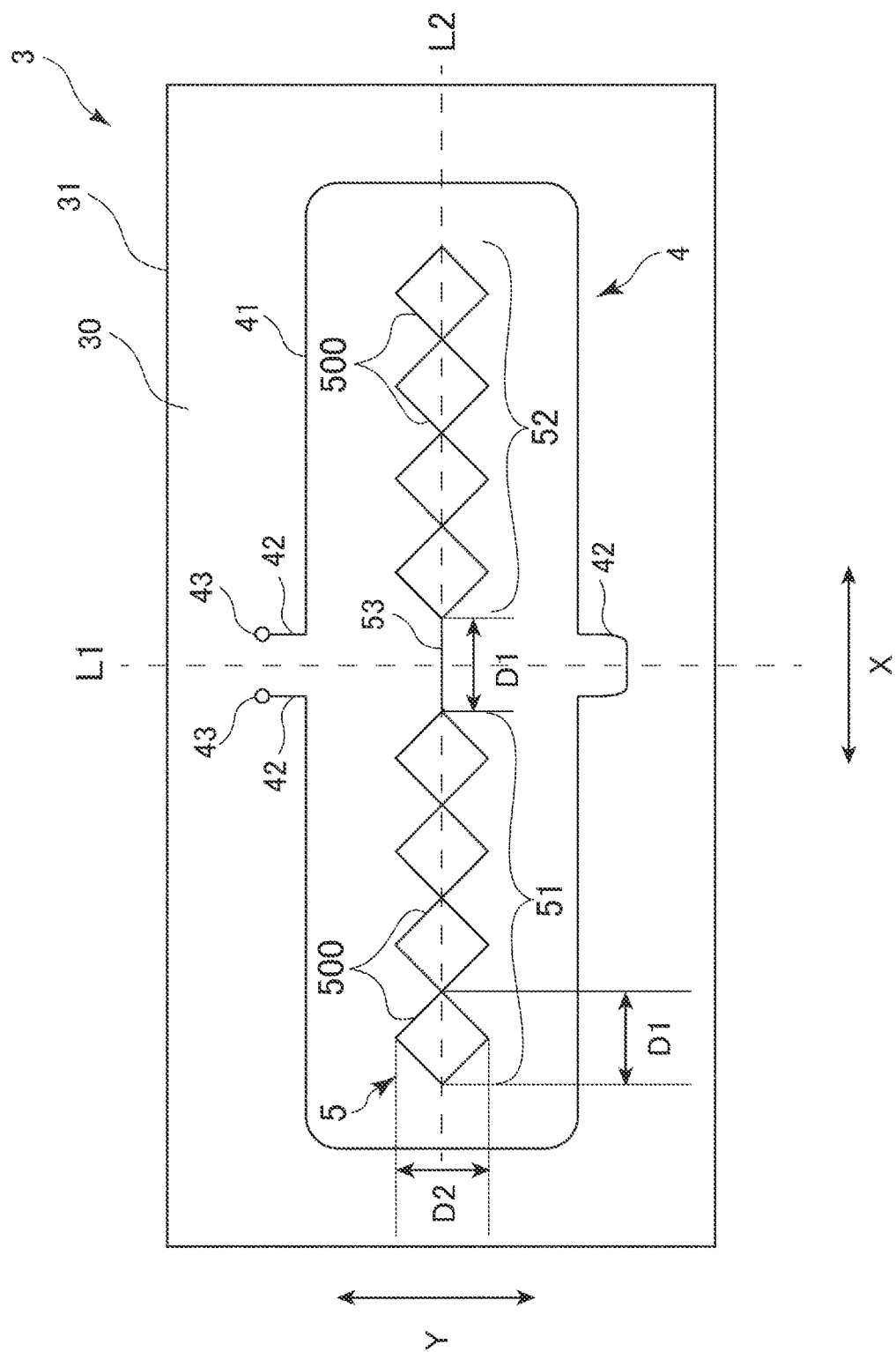
FIG. 3 is a top view of a head for the electromagnetic inductive encoder.

FIG. 3 is a top view of the head 3 for the electromagnetic inductive encoder 1.

As shown in FIG. 3, the head 3 has a transmitter section 4 provided on an insulating substrate 31 made of glass epoxy resin, and a receiver section 5, which receives changes in magnetic flux from the scale coil 22. The insulating substrate 31 may be made of a material such as glass or silicon instead of a glass epoxy resin.

The transmitter unit 4 is provided to face the scale 2 and has a transmission coil 41 that produces magnetic flux in the scale coil 22 (see FIG. 2).

The transmission coil 41 is made of a material with low electrical resistance, such as aluminum, copper, or gold, and is arranged in a substantially rectangular shape surrounding the receiver section 5. The transmitter coil 41 does not have to be arranged in a substantially rectangular shape surrounding the receiver section 5, and can be configured in any way as long as it can generate magnetic flux in the scale coil 22.

The transmission coil 41 is arranged linearly symmetrically with the axis L1 of the Y-direction orthogonal to the X-direction, which is the measurement direction, in the plane 30 where the transmission coil 41 is provided.

The transmission coil 41 has a pull-out wiring section 42 with wiring that extends and is pulled out from the transmission coil 41 for connection to other components.

The pull-out wiring section 42 is arranged linearly symmetrically with the axis of at least one of the X-direction, which is the measurement direction, and the Y-direction orthogonal to the X-direction in the plane 30 where the transmission coil 41 is provided. In the present embodiment, the pull-out wiring section 42 is arranged linearly symmetrically with the axis L1 of the Y-direction, which is the orthogonal direction. At least one of the wirings in the pull-out wiring section 42 has a connection section 43 for connecting to other components. The connection section 43 is through holes, via holes, etc.

The receiver section 5 has a plurality of receiving coils 500 arranged inside the transmission coil 41 and on the same side along the X-direction, which is the measurement direction to receive the change in magnetic flux from the scale coil 22. The receiver section 5 has a first receiver section 51 with at least one receiving coil 500, a second receiver section 52 that is provided apart from the first receiver section 51 and has at least one receiving coil 500 different from the first receiver section 51, and connection wiring 53 that connects the first receiver section 51 and second receiver section 52. The receiving coil 500 and the connection wiring 53 that constitute the first receiver section 51 and the second receiver section 52 are formed of materials with low electrical resistance, such as aluminum, copper, and gold.

The first receiver section 51 and the second receiver section 52 are arranged linearly symmetrically with the axis L1 of the Y-direction, which is orthogonal to the X-direction (measurement direction) in the plane 30 where the receiving coils 500 are arranged, and are arranged in the same number. In the present embodiment, the first receiver section 51 has four receiving coils 500, and the second receiver section 52 has four receiving coils 500, each having the same number of receiving coils 500. The first receiver section 51 and the second receiver section 52 are arranged linear symmetry with the axis L1 of the Y-direction with the connecting wiring 53 at the center. In the present embodiment, the number of receiving coils 500 in the first receiver section 51 and the second receiver section 52 is four, but each may have more receiving coils 500, or each may have fewer receiving coils 500.

The connection wiring 53 is arranged in a straight line parallel to the X-direction, which is the measurement direction, and formed with a length that is an integer multiple of the length D1 in the X-direction of one receiving coil 500. Specifically, the connection wiring 53 is formed with a length that is an odd multiple of the length D1 in the X-direction of one receiving coil 500. In the present embodiment, the connection wiring 53 is formed with the same length as the length D1 in the X-direction of one receiving coil 500. The connection wiring 53 may not be the same length as the length D1 in the X-direction in one receiver coil 500, but may be formed to be three times as long as the length D1 or five times as long as the length D1.

The connection wiring 53 is arranged so that the line L2 extending the connection wiring 53 is provided at the center of the length D2 in the Y-direction, which is the orthogonal direction of each receiving coil 500.

Figure 4A:
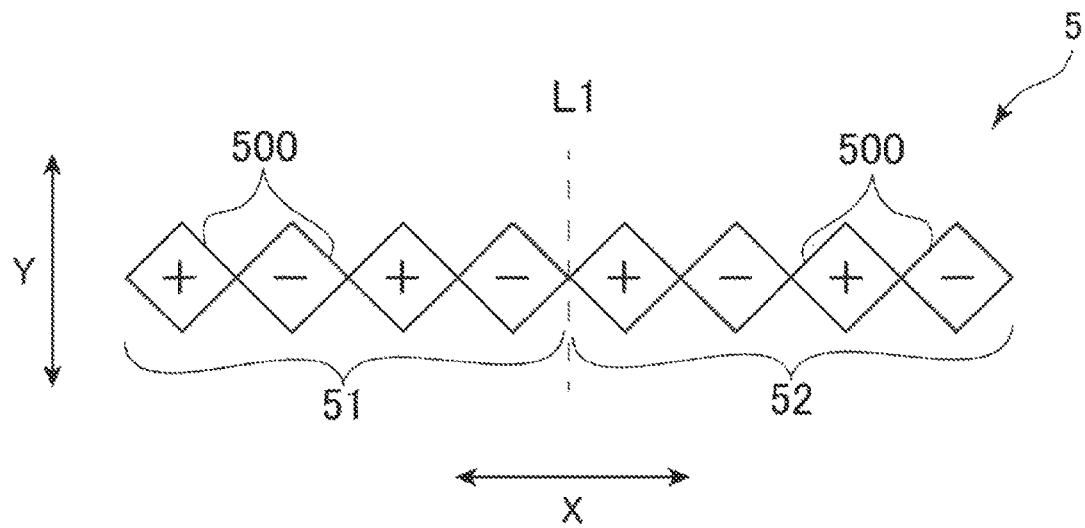
FIGS. 4A and 4B show the principle of the magnetic flux generated in the receiving coils for the electromagnetic inductive encoder.
Figure 4B:
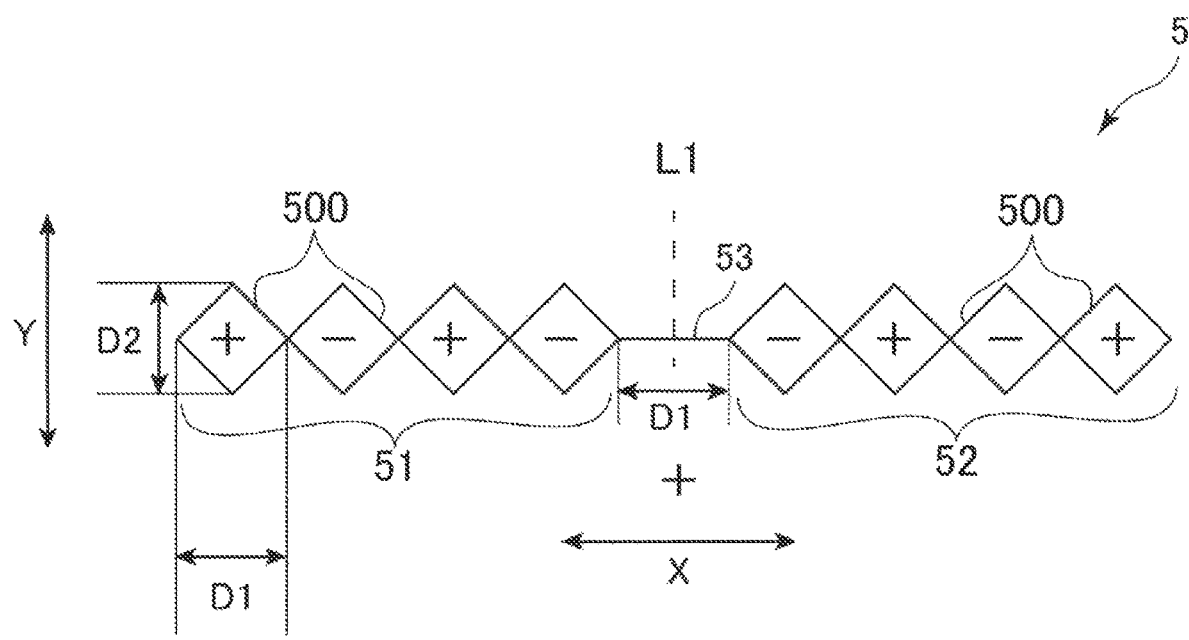

FIGS. 4A and 4B show the principle of the magnetic flux generated in the receiving coils 500 for the electromagnetic inductive encoder 1. Specifically, FIG. 4A shows the magnetic flux generated in the receiving coil 500 without the connecting wiring 53. FIG. 4B shows the magnetic flux generated in the receiving coil 500 with the connecting wiring 53.

Here, as shown in FIG. 4A, the magnetic flux in the positive direction and the magnetic flux in the negative direction are alternately generated in the receiving coils 500 arranged side by side along the X-direction, which is the measurement direction. Therefore, if the connection wiring 53 is formed at an arbitrary length, the balance between the magnetic flux in this positive direction and the magnetic flux in the negative direction may be lost, and the accuracy of the measurement results may deteriorate.

However, as shown in FIG. 4B, by forming the connection wiring 53 with a length that is an odd multiple of or the same as the length D1 in the X-direction, which is the measurement direction, in one receiving coil 500, it is possible to interpolate the magnetic flux in the positive direction that is supposed to be generated at the connecting wiring 53. In the electromagnetic inductive encoder 1, by the connection wiring 53, the first receiver section 51 and second receiver section 52 can be arranged in a linearly symmetrical manner, and the deterioration of measurement accuracy can be suppressed.

Figure 5A:
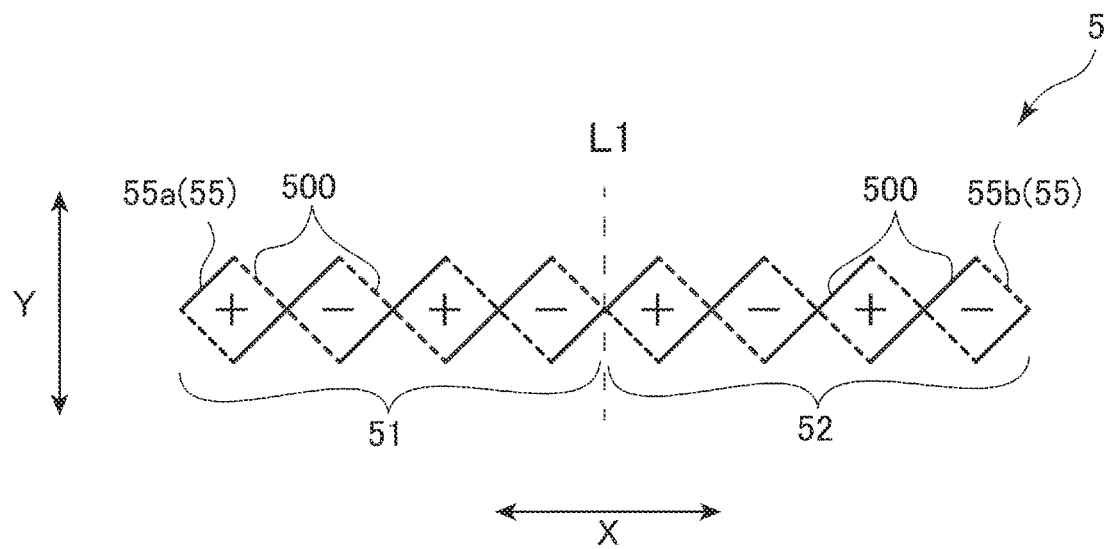
FIGS. 5A and 5B are schematic diagrams showing the wiring layers of the receiver section for the electromagnetic inductive encoder.
Figure 5B:
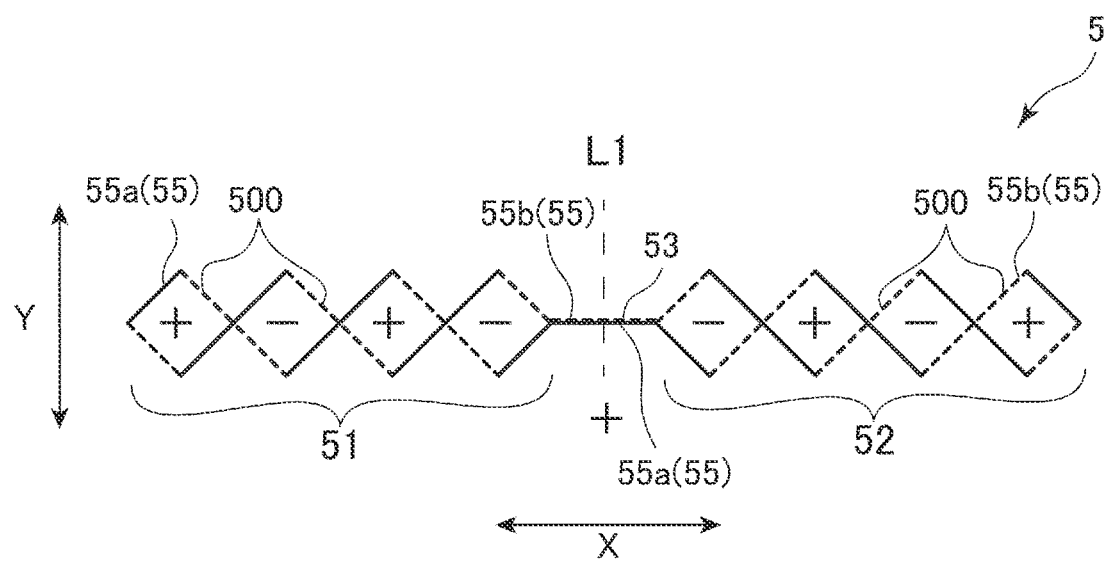

FIGS. 5A and 5B are schematic diagrams showing the wiring layers of the receiver section 5 for the electromagnetic inductive encoder 1. Specifically, FIG. 5A shows the coil wiring 55 without the connection wiring 53. FIG. 5B shows the coil wiring 55 with the connection wiring 53.

The receiver section 5 has a plurality of wiring layers (not shown in the drawings) in which coil wiring 55 forming the receiving coils 500 is provided. The coil wirings 55 are provided over the plurality of wiring layers and are arranged linearly symmetrically with axis L1 of the Y-direction, which is the orthogonal direction, in each of the wiring layers.

Specifically, at least two coil wirings 55a and 55b are used for coil wirings 55 across multiple wiring layers. For the convenience of explanation, in FIGS. 5A and 5B, the coil wiring 55a is shown in solid line, and the other coil wiring 55b, which is different from the coil wiring 55a, is shown in dashed line.

As shown in FIG. 5A, when the connection wiring 53 is not used, the connection wirings 55a and 55b are not arranged linearly symmetrically with the axis L1 of the Y-direction (orthogonal direction). If they are not arranged linearly symmetrically with the axis L1 of the Y-direction, the balance of the detected magnetic flux may be disrupted, and the accuracy of the measurement results may deteriorate.

However, as shown in FIG. 5B, by using the connection wiring 53, the electromagnetic inductive encoder 1 can arrange the coil wirings 55a and 55b linearly symmetrically with the axis L1 of the Y-direction (orthogonal direction). In the electromagnetic inductive encoder 1, by the connection wiring 53, the coil wirings 55a and 55b can be arranged in a linearly symmetrical manner, and the deterioration of measurement accuracy can be suppressed.

According to such first embodiment, the following functions and effects can be acquired.

(1) In the receiver section 5, the first receiver section 51 and the second receiver section 52 provided apart from the first receiver section 51 are connected by the connection wiring 53. The first receiver section 51 and the second receiver section 52 are arranged linearly symmetrically with the axis of the Y-direction, which is the orthogonal direction, and are arranged in the same number. With this configuration, even if, for example, the head 3 rotates and one or the other end of the head 3 in the X-direction (the measurement direction), is close to or separated from the scale, the receiving section 5 can still detect the magnetic flux change stably because the receiver section 5 is arranged linearly symmetrically with the axis L1 of the Y-direction (the orthogonal direction) with the connecting wiring 53 at the center. Therefore, the electromagnetic inductive encoder 1 can maintain the accuracy of measurement results by suppressing the effects of changes in the magnetic flux received by the receiver section 5.

(2) The first receiver section 51 and the second receiver section 52 are arranged linearly symmetrically with the axis L1 of the Y-direction, which is orthogonal to the X-direction (measurement direction) in the plane 30 where the receiving coils 500 are arranged, and are arranged in the same number. Thereby, symmetry can be achieved. Therefore, the manufacturing cost of the electromagnetic inductive encoder 1 can be reduced compared to the manufacturing cost of conventional encoders.

(3) The connection wiring 53 is arranged in a straight line parallel to the X-direction, which is the measurement direction, and is formed with a length that is an integer multiple of the length in the measurement direction of one receiving coil 500. Thereby, the magnetic flux at the connection wiring 53 can be appropriately interpolated. Therefore, the electromagnetic inductive encoder 1 can maintain the accuracy of measurement results by suppressing the effects of changes in the magnetic flux received by the receiver section 5.

(4) Since the connection wiring 53 is arranged in a straight line parallel to the X-direction (the measurement direction), the symmetry of the arrangement of the plurality of receiving coils 500 in the receiving unit 5 with the axis L1 of the Y-direction (the orthogonal direction) can be easily achieved.

(5) Since the connection wiring 53 is formed with a length that is an odd multiple of the length in the X-direction (the measurement direction) in one receiving coil 500, it is possible to properly interpolate for the magnetic flux at the connection wiring without disturbing the magnetic flux in the positive and negative directions generated in each receiving coil 500.

(6) Since the coil wiring 55 that forms the receiving coil 500 is arranged linearly symmetrically with the axis L1 of the Y-direction (the orthogonal direction) in each of the multiple wiring layers, symmetry can be easily achieved at the receiver section 5.

(7) Since the transmission coil 41 is arranged linearly symmetrically with the axis L1 of the Y-direction (the orthogonal direction) orthogonal to the X-direction (the measurement direction) in the plane 30 where the transmission coil 41 is provided, symmetry can be easily achieved not only in the receiver section 5 but also in the transmitter section 4.

(8) Even when the transmission coil 41 has the pull-out wiring section 42, since the pull-out wiring section 42 is arranged linearly symmetrically with the axis of at least one of the X-direction (the measurement direction) and the Y-direction, which is the orthogonal direction orthogonal to the measurement direction in the plane 30 where the transmission coil 41 is provided, symmetry can be easily achieved.

Second Embodiment

In the following, the second embodiment of the present invention will be described on the basis of FIG. 6. In the following description, portions already described are denoted by the same reference numerals, and the description thereof is omitted.

Figure 6:
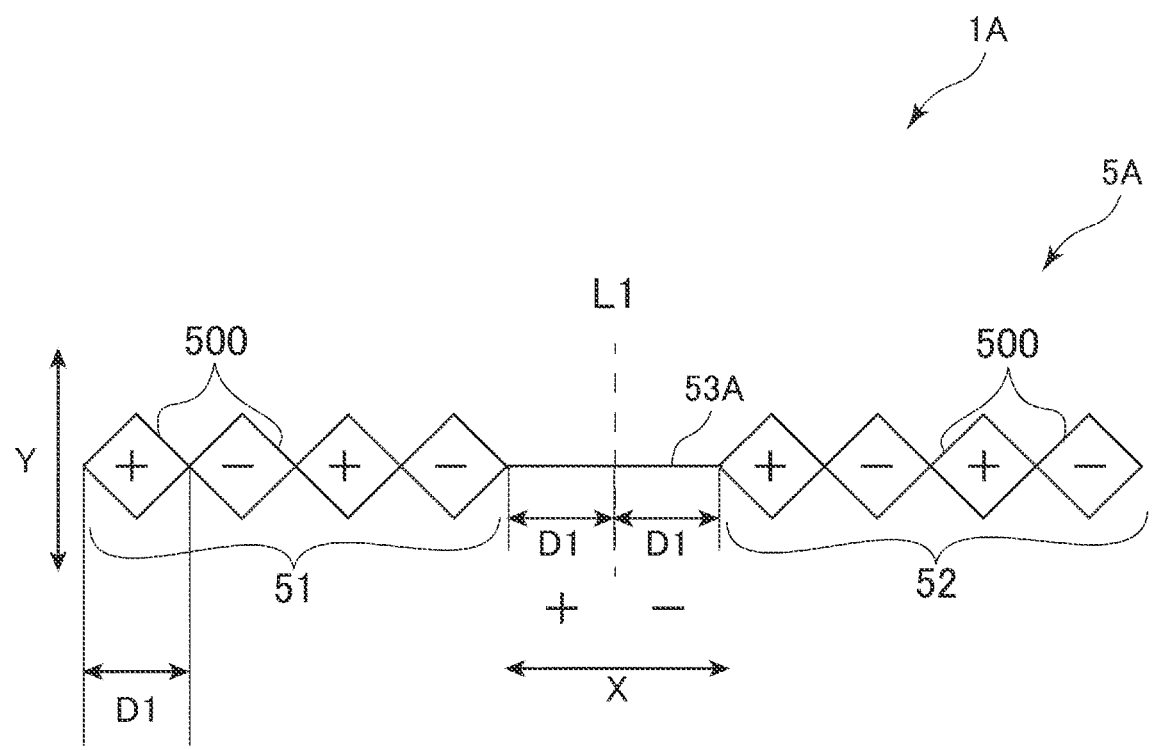
FIG. 6 is a top illustrating a receiver section of the electromagnetic inductive encoder according to the second embodiment.

FIG. 6 is a top illustrating a receiver section 5A of the electromagnetic inductive encoder 1A according to the second embodiment. The head 3 in the second embodiment has a configuration similar to that of the head 3 in the first embodiment above (see FIG. 3), except for the receiving section 5A.

In the first embodiment, the connection wiring 53 of the receiver section 5 is formed with a length that is an odd multiple of the length D1 in the X-direction (the measurement direction) of one receiving coil 500.

The connection wiring 53A of the receiver section 5A in the second embodiment differs from the first embodiment above in that it is formed with a length that is an even multiple of the length D1 in the X-direction (the measurement direction) of one receiving coil 500.

Specifically, as shown in FIG. 6, the connection wiring 53A is formed with a length twice that is an even multiple of the length D1 in the X-direction of one receiving coil 500. The connection wiring 53A may be formed with a length that is four times, or six times, instead of twice the length D1 in the X-direction in one receiving coil 500.

In the present embodiment, although the direction of the magnetic flux generated in each receiving coil 500 is not linearly symmetrically with the axis L1 of the Y-direction (the orthogonal direction), the entire receiver section 5A is linearly symmetrically with the axis L1 of the Y-direction. Therefore, the connection wiring 53A is formed with a length that is an even multiple of the length D1 in the X-direction, which is the measurement direction in one receiving coil 500, so that the magnetic flux that is supposed to be generated in the connection wiring 53A can be interpolated with an appropriate length.

In such a second embodiment, it is also possible to acquire functions and effects similar to those in (1) to (4) and (6) to (8) in the first embodiment. In addition, the following function and effect can be acquired.

(9) Since the connection wiring 53A is formed with a length twice that is an even multiple of the length in the X-direction (the measurement direction) in one receiving coil 500, it is possible to properly interpolate for the magnetic flux at the connection wiring 53A without disturbing the magnetic flux in the positive and negative directions generated in each receiving coil 500.

Third Embodiment

In the following, the third embodiment of the present invention will be described on the basis of FIG. 7. In the following description, portions already described are denoted by the same reference numerals, and the description thereof is omitted.

FIG. 7 is a top illustrating a transmitter section 4B of the electromagnetic inductive encoder 1B according to the third embodiment. The head 3 in the third embodiment (see FIG. 3) has a configuration similar to that of the head 3 in the first embodiment above, except for the transmitter section 4B.

In the first embodiment above, the transmitter section 4 consists of a single transmission coil 41 and is arranged in a rectangular shape surrounding the receiver section 5.

The third embodiment differs from the first embodiment in that the transmitter section 4B has two transmission coils 41B, and the two transmission coils 41B are arranged linearly symmetrically with the axis of at least one of the X-direction, which is the measurement direction, and the Y-direction, which is the orthogonal direction orthogonal to the X-direction, at the plane 30 where the transmission coils 41B are provided.

Specifically, as shown in FIG. 7, the two transmission coils 41B are provided side by side along the X-direction, which is the measurement direction. Note that the two transmission coils 41B may be provided side by side along the Y-direction.

The pull-out wiring sections 42B are provided at both ends along the X-direction, which is the measurement direction of the transmitter section 4B. The pull-out wiring section 42B is arranged linearly symmetrically with both the axis L2 of the X-direction (measurement direction) the axis L1 of the Y-direction (the orthogonal direction orthogonal to the X-direction) in the plane 30 where the transmission coil 41B is provided, If the transmitter 4B and the receiver 5 (see FIG. 3) cannot be placed on the same plane, the transmitter 4B and the receiver 5 may be placed on separate components. Specifically, the transmitter section 4B and the receiver section 5 may be placed to face with each other, and the scale 2 may be placed between the transmitter section 4B and the receiver section 5. This arrangement allows the receiver section 5 to detect the amount of relative movement of the scale 2, which is placed between the transmitter section 4B and the receiver section 5.

In such a third embodiment, it is also possible to acquire functions and effects similar to those in (1) to (7) in the first embodiment. In addition, the following function and effect can be acquired.

(10) Even when the transmitter section 4B is consist of two transmission coils 41B, since the two transmission coils 41B are arranged linearly symmetrically with both the axis L2 of the X-direction (measurement direction) and the axis L1 of the Y-direction (the orthogonal direction orthogonal to the measurement direction) in the plane 30 where the transmission coils 41B is provided, symmetry can be easily achieved.

Modification of Embodiment

Note that the present invention is not limited to each of the above embodiments and modification, improvement, and the like within the spirit and the scope of the present invention are included.

For example, in each embodiment described above, the electromagnetic inductive encoder 1, 1A and 1B is used in the electromagnetic inductive caliper as a measuring instrument, the electromagnetic inductive encoder may be used in other measuring instruments such as a dial gauge (test indicator) or a micrometer. That is, the electromagnetic inductive encoder is not particularly limited with respect to the type and method of the measuring instrument used and can be used in other measuring instruments and the like. The equipment on which the electromagnetic inductive encoder of the present invention is mounted is not particularly limited.

The electromagnetic inductive encoder may be used in a device other than a measurement device such as a sensor.

In the above-mentioned embodiments, the electromagnetic inductive encoder 1, 1A and 1B are so-called linear encoders with a long scale 2, but they can also be so-called rotary encoders where the scale is formed in an arc.

The connection wiring 53 of the receiver section 5 in the first embodiment is formed so as to have a length that is an odd multiple of the length D1 in the X-direction, which is the measurement direction of one receiving coil 500. The connection wiring 53A of the receiver section 5A in the second embodiment is formed so as to have a length that is an even multiple of the length D1 in the X-direction of one receiving coil 500. However, the connection wiring may be formed with an arbitrary length. Although the connection wiring 53, 53A are arranged in a straight line parallel to the X-direction, which is the measurement direction, the connection wiring does not have to be arranged in a straight line. In short, the connection wiring should be able to connect the first receiver section to the second receiver section.

Although there is only one pair of draw wiring sections 42 and 42B in the first and third embodiments above, a plurality may be provided in the transmitter sections 4 and 4B. In short, the pull-out wiring section should be arranged linearly symmetrically with the axis of at least one of the measurement direction and the orthogonal direction orthogonal to the measurement direction in the plane where the transmission coil is provided.

In the above embodiments, the transmitter sections 4 and 4B are also arranged in a linearly symmetrical manner, but the transmitter sections do not have to be arranged in a linearly symmetrical manner.

INDUSTRIAL APPLICABILITY

As described above, the present invention can be suitably used for the electromagnetic inductive encoder.

What is claimed is:

1. An electromagnetic inductive encoder comprising a scale with a scale coil and a head that moves relative to the scale along the measurement direction, wherein the head includes:
   a transmitter unit having a transmission coil that generates magnetic flux in the scale coil; and
   a receiver section having a plurality of receiving coils arranged in the same plane along the measurement direction that receives changes in magnetic flux from the scale coil, and
   wherein the receiver section includes:
   a first receiver section having at least one receiving coil;
   a second receiver section that is provided apart from the first receiver section and has at least one receiving coil different from the first receiver section; and
   connection wiring that connects the first receiver section and second receiver section,
   wherein the first receiver section and the second receiver section are arranged linearly symmetrically with the axis of the orthogonal direction orthogonal to the measurement direction in the plane where the receiving coils are arranged, and are arranged in the same number, and
   wherein the receiver section has a plurality of wiring layers in which coil wiring forming the receiving coil is provided, and the coil wiring is arranged linearly symmetrically with the axis of the orthogonal direction in each of the wiring layers.

2. The electromagnetic inductive encoder as claimed in claim 1, wherein the connection wiring is arranged in a straight line parallel to the measurement direction and is formed with a length that is an integer multiple of the length in the measurement direction in one receiving coil.

3. The electromagnetic inductive encoder as claimed in claim 2, wherein the connection wiring is formed with a length that is an odd multiple of the length in the measurement direction in one receiving coil.

4. The electromagnetic inductive encoder as claimed in claim 2, wherein the connection wiring is formed with a length that is an even multiple of the length in the measurement direction in one receiving coil.

5. The electromagnetic inductive encoder as claimed in claim 4, wherein the transmitter section has two transmission coils, and the two transmission coils are arranged linearly symmetrically with the axis of at least one of the measurement direction and the orthogonal direction orthogonal to the measurement direction in the plane where the transmission coils are provided.

6. The electromagnetic inductive encoder as claimed in claim 1, wherein the transmission coil is arranged linearly symmetrically with the axis of the orthogonal direction orthogonal to the measurement direction in the plane where the transmission coil is provided.

7. The electromagnetic inductive encoder as claimed in claim 1, wherein the transmission coil has a pull-out wiring section with wiring that extends and is pulled out from the transmission coil for connection to other components, and the pull-out wiring section is arranged linearly symmetrically with the axis of at least one of the measurement direction and the orthogonal direction orthogonal to the measurement direction in the plane where the transmission coil is provided.

* * * * *